March 8, 1960　　　R. T. BURNETT　　　2,927,664
BRAKE ASSEMBLY
Filed June 1, 1954　　　　　　　　　　　2 Sheets-Sheet 1

INVENTOR.
RICHARD T. BURNETT
BY Cecil J. Arens
ATTORNEY

March 8, 1960 R. T. BURNETT 2,927,664
BRAKE ASSEMBLY

Filed June 1, 1954 2 Sheets-Sheet 2

INVENTOR.
RICHARD T. BURNETT
BY Cecil J Arens
ATTORNEY

United States Patent Office 2,927,664
Patented Mar. 8, 1960

2,927,664

BRAKE ASSEMBLY

Richard T. Burnett, South Bend, Ind., assignor to Bendix Aviation Corporation, South Bend, Ind., a corporation of Delaware Application June 1, 1954, Serial No. 433,609

17 Claims. (Cl. 188—70)

This invention relates to improvements in brakes of the type combining disk and drum brake features.

In the construction of the brake of the invention many of the advantages of both drum and disk brakes have been incorporated and most of the disadvantages either eliminated or reduced in effectiveness by rearrangement of the parts.

An object of the invention is to provide a combined disk and shoe brake unit in which the disk element is floatably mounted on the shoe element and operatively connected thereto so that axial movement of the disk element into frictional engagement with a rotatable member imparts a substantially radial movement to the shoe element to thereby establish frictional engagement between said shoe element and said rotatable member.

Another object of the invention is to provide a brake having a combined disk and shoe brake unit operatively connected to a fluid motor via a lever system pivotally interposed between said motor and said disk.

A still further object of the invention is to provide a brake employing two interdependent self energizing friction elements engageable with arcuate and plane surfaces of a rotatable member.

A very important object is to combine in a disk and shoe brake the following salient features: (1) a self-energizing disk element (2) a shoe element actuable by the disk element and (3) a hydraulic fluid motor situated so as to be affected the least by heat developed in the brake.

The above and other objects and features of the invention will be apparent from the following description of the device taken in connection with the accompanying drawings which form a part of the specification and in which.

Figure 1:
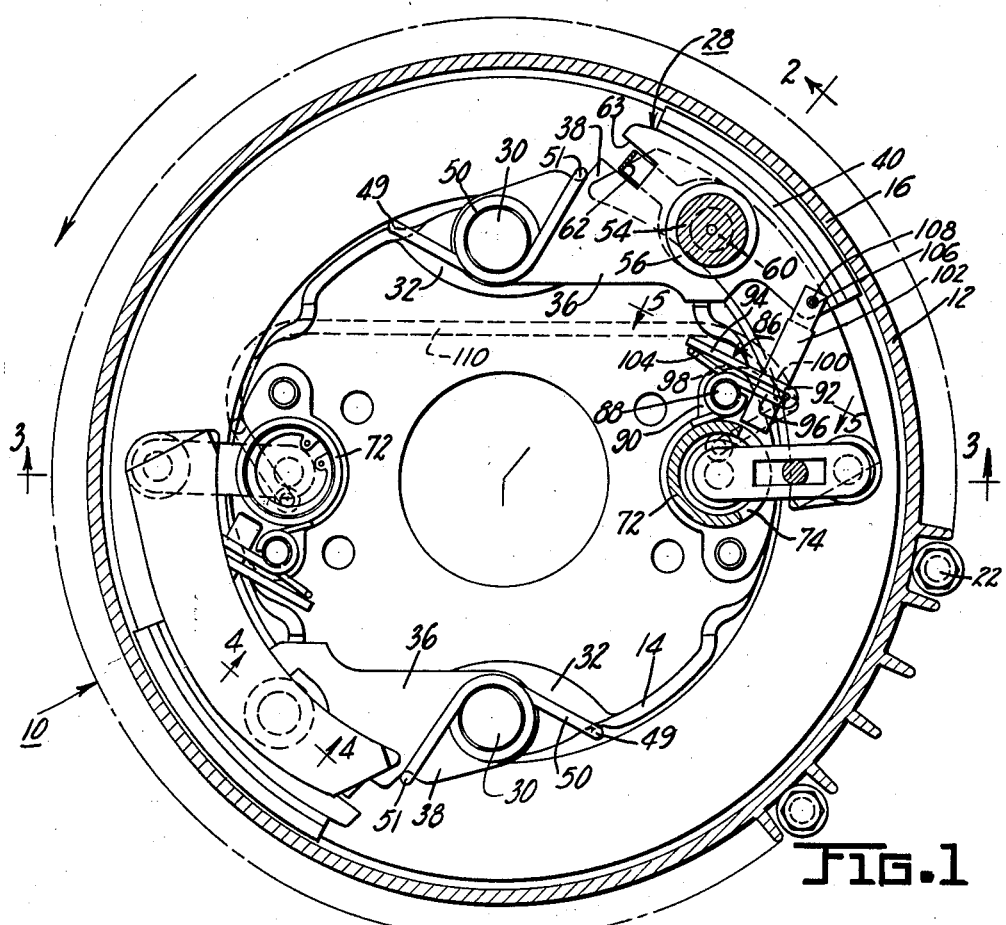
Figure 1 is a side elevation of the brake of my invention with one side of the drum and the disk element on the right side removed to show the brake actuating mechanism more clearly.
Figure 2:
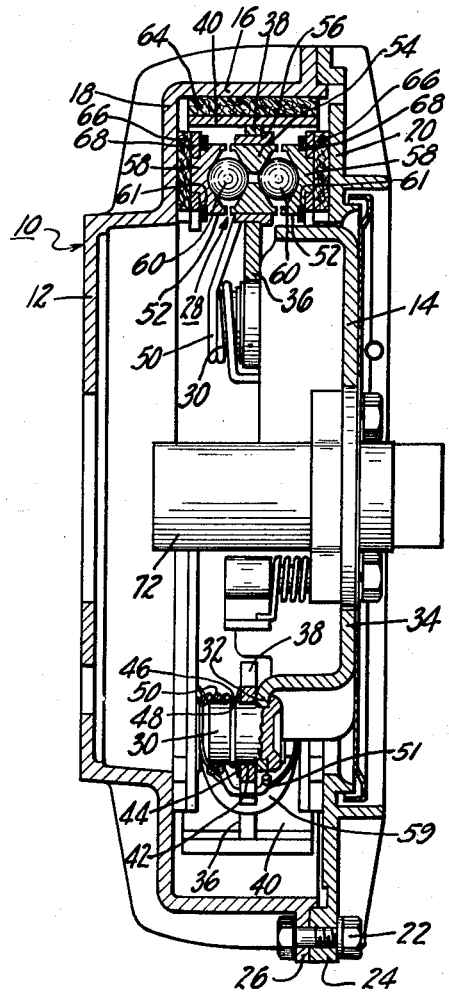
Figure 2 is a view taken on the line 2—2 of Figure 1.

Referring to Figures 1 and 2 of the drawings the reference numeral 10 designates a wheel brake assembly comprising a rotatable member 12 which is secured to a wheel, not shown, and a fixed member 14 adapted to be fastened to a vehicle structure, not shown. The braking surface portion of the rotatable member can be described as U-shaped in cross section since it comprises a cylindrical portion 16 and parallel side portions 18 and 20. The side portions 18 and 20 provide plane or flat surfaces lying in parallel planes angularly displaced at substantially right angles to the cylindrical surface formed in said cylindrical portion 16. To simplify assembly of the brake the rotatable member 12 is constructed so that the side 20 is removably mounted thereon by bolts 22 which pass through flanges 24 and 26 of the side 20 and cylindrical portion 16, respectively. The rotatable member and details of construction are claimed and described in my application Serial No. 434,846, filed June 7, 1954, now abandoned.

In order to check or retard the motion of the rotatable member 12, a friction device or unit 28 is pivotally supported on an anchor member 30 located radially inwardly from the aforesaid plane and cylindrical surfaces of said rotatable member and suitably attached to the fixed member 14. There are two such units 28 suitably positioned around the fixed member for frictionally engaging the rotatable member. The two friction units are arranged so as to be energized when rotation of the member 12 is in the direction of the arrow, that is, counterclockwise as viewed in Figure 1. Since the units 28 are of identical construction only one will be described in detail.

It will be observed (Figure 2) that the fixed member 14 is formed so that the portion 32 to which the anchor 30 is secured is offset from the back portion 34 thus placing the offset portion 32 near the plane through which the braking forces act on the anchor 30. This construction of the fixed member results in a compact and durable mounting for the friction unit and keeps to a minimum offset loading on the anchor member.

Figure 4:
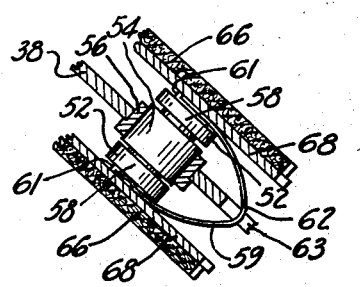
Figure 4 is a view taken on the line 4—4 of Figure 1.

The friction unit or device includes a friction or shoe element 36 having a web portion 38 and an arcuate plate or rim portion 40 suitably attached to the web. The web is provided with an opening 42 through which the anchor member 30 extends. The friction element 36 is retained in place against the offset portion 32 by a dished washer 44 and a C-ring 46 removably fit into groove 48 of the anchor member. A torsion spring 50 is carried at the outer end of the anchor member, with one end 49 of the spring urged against the offset portion 32 of the fixed member and the other end or free end 51 of the spring engaging the web 38 of the friction element for rotating the same in a clockwise direction as viewed in Figure 1. The friction unit includes two other friction or disk elements 52 operatively connected to the first mentioned friction element through a ball and ramp arrangement comprising an inner section 54 mounted in a bushing 56 carried by the friction element 36 and outer sections 58 pressed into side plates 68. The inner and outer sections are formed with cam surfaces or ramps between which balls 60 are interposed. The second mentioned friction elements 52 are held in assembled relationship to the first friction element by a U-shaped spring clamp 59 (see Fig. 4) the ends of which are bifurcated in order to straddle the reduced diameter end portions 61 of the outer sections 58. The closed end 62 of the clamp rides in a slot 63 of the web 38. Any relative movement of the first and second friction elements from the position of Figure 2 will cause the balls 60 to ride upon the ramps thus imparting axial or lateral movement to the second friction elements. The first friction element 36 is equipped with brake lining material 64 appropriately fastened to the plate 40 and the second friction elements 52 are furnished with brake lining material 66 secured to the flat side plates 68 extending circumferentially along the sides 18 and 20 of the rotatable member.

Figure 3:
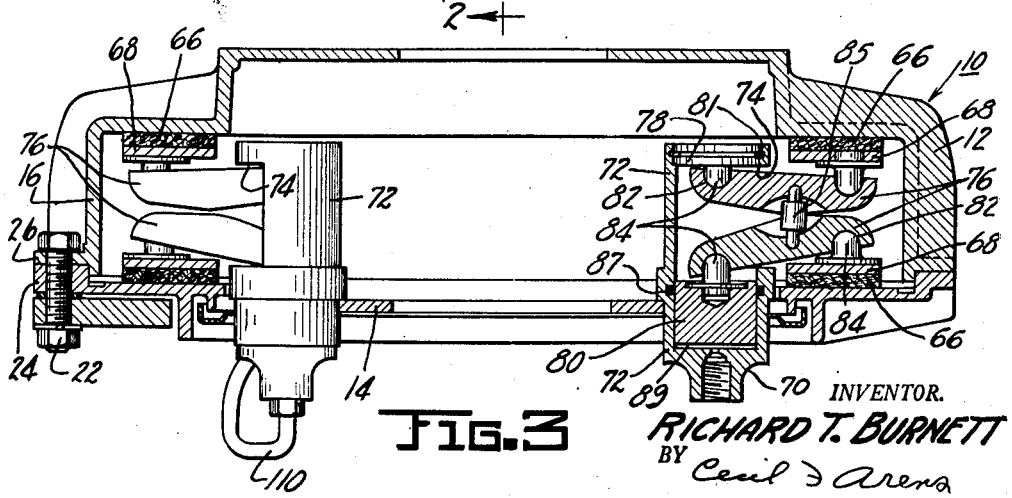
Figure 3 is a view taken on the line 3—3 of Figure 1.

For actuating the friction unit 28 a fluid motor 70, as best seen in Fig. 3 is mounted on the fixed member 14 at a point radially inward from the friction engaging surfaces and sufficiently remote from the elements of the brake which generate considerable heat during a brake application to minimize heat transfer to said fluid motor. The fluid motor 70 includes a housing 72 formed with an axial extending slot 74 in the side wall. The friction unit 28 is connected to the fluid motor 70 via lever means including two levers 76 passing through the slot 74. In the drawing the levers are illustrated as force multiplying but this is a design expedient and they can, for example, have a one to one ratio. The ends of the levers extending into the housing are rockably connected to a stationary end member 78 of the housing and to a piston 80. A snap ring 81 removably retains the member 78 within the housing. The other ends of the levers are likewise rockably connected to the ends of the plates 68 at points on the plates circumferentially spaced from the points at which the plates are secured to the outer sections 58. These rockable connections are provided by sockets 82 in the ends of the levers and rounded projections 84 on the end member 78, piston 80, and plates 68 respectively. A link 85 interposed between the levers provides a fulcrum about which the levers are rotated when the piston 80 is moved. An O-ring 87 located in the housing 72 encircles the piston 80 to prevent leakage of fluid from chamber 89. Any movement of the piston 80 in a brake applying direction spreads the levers 76 at their outer ends thus moving the friction elements 52 axially with respect to the brake axis.

As best seen in Figure 3, the levers and link arrangement approximate a parallelogram type linkage permitting relative shifting of the disk friction elements to accommodate them to the drum surfaces. Moreover, the linkage is such that it can follow up to compensate for unequal wear on the two disk friction elements. Also the forces acting on the two friction elements tending to spread them are automatically substantially equalized. The overall linkage combined being such that the levers pivot in a plane parallel to the sides 18 and 20 of the rotatable member as well as perpendicularly thereto.

The disk friction elements 52 are self-energizing upon actuation thereof by fluid motor 70. Initial engagement of one end of friction elements 52 and the sides of the drum 18 and 20 is produced by the spreading of the outer ends of levers 76. The resulting frictional forces developed between the sides of the drum and the friction elements 52 tend to cause a circumferential movement of friction elements. The ends of the friction elements attached to the outer ends of the levers 76 being constrained to move in an arc about the fixed inner ends of the levers (except for axial motion of the piston 80). The frictional forces being opposed by the balls 60 acting on the cam surfaces of members 58 at the opposite ends of friction members 52 causing a spreading of said opposite ends, resulting in further frictional engagement between the friction elements and drum surfaces 18 and 20. The balls 60 transmit the frictional forces from friction elements 52 to the friction element 36, causing it to pivot about its anchor 30 establishing frictional contact with the cylindrical surface of cylindrical portion 16. The friction element 36 is also self energizing in the same manner as the shoe of a conventional internal shoe brake.

Figure 5:
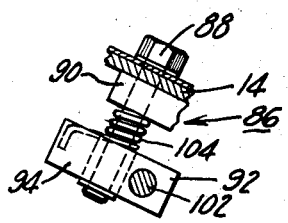
Figure 5 is a view partly in section taken on the line 5—5 of Figure 1.

In order that the shoe element 36 of the friction unit 28 may be adjusted as the lining 64 wears, an adjusting mechanism 86 is provided. The mechanism is supported on the fixed member 14 by a machine bolt 88 threadedly engaging flange 90 of the fluid motor 70, as best shown in Figure 5. A gripping member 92 is rotatably carried at the end of bolt 88. The gripping member is formed with parallel sides 94 and 96, each having an opening 98 and 100 respectively, into which a pin 102 slidably fits. A spring 104 is coiled around the bolt 88 with one end of the spring engaging the fluid motor housing 72 to prevent rotation of the spring and the other end or free end of the spring engaging the gripping member 92, tending to rotate the same clockwise, as viewed in Figure 1. The end of the pin 102 opposite the end which slides in the gripping member 92 is bifurcated so as to straddle the web 38. The bifurcations are provided with elongated openings 106 into which a pin 108 extends for limited movement therein. The pin 108 is securely held in the web 38 and projects on each side thereof to thereby engage the elongated openings in the bifurcations. The elongated slots in the bifurcations permit a slight amount of lost motion between the pins 102 and 108.

The adjusting mechanism is constructed so that the pin 102, as viewed in Figure 1, can be moved upward easily relative to the gripping member 92 but will not move downward because of the high frictional resistance. As a result of each brake application the friction unit 28 is rotated counterclockwise. If there is a substantial amount of wear of the lining 64 as the result of a brake application the pin 102 will be moved upwardly relative to the member 92 and friction member 28 will on release of the brake be returned an amount equal to the clearance between the hole 106 and the pin 108.

With reference to Figure 1 a conduit 110 connects the two cylinders 72 to provide free communication therebetween. A source of fluid under pressure, not shown, is connected to one or the other of the cylinders 72 for actuating the friction units 28.

Operation and performance of the brake of the invention is as follows:

Assume a brake application is made with the rotatable member turning in the direction of the arrow counterclockwise in Figure 1. The fluid under pressure acting in the cylinders 72 will move the pistons 80 axially spreading the levers at the outer ends, thus urging the friction elements 52 against the plane surfaces of the sides 18 and 20. The frictional engagement between the friction elements 52 and sides 18 and 20 causes limited rotation of the elements in the direction of rotation of the rotatable member, in this instance, in the direction of the arrow. This rotation of the friction elements 52 relative to the friction element 36 cams the first mentioned friction elements axially against the drum surfaces 18 and 20 augmenting the applying force from the piston and levers. The friction elements 52 anchor through the balls 60 on friction element 36 causing it to frictionally engage the arcuate surface of the cylindrical portion 16 of the rotatable member. As the pressure in the cylinders 72 is increased the frictional forces developed in the friction elements 52 tending to further rotate the friction element 36 become proportionately greater. When braking in the forward direction, that is, in the direction of the arrow both the disk and shoe elements are effective. When the pressure in the cylinders 72 is relieved springs 50 and 59 return the friction unit to released position out of frictional engagement with the rotatable member.

When a brake application is made with drum rotation opposite to that of the arrow, that is, in reverse rotation the pistons 80 cause axial spreading of the levers at their outer ends to thereby urge the friction elements 52 against sides 18 and 20 in the same manner as previously described for forward rotation. This frictional engagement between the friction elements 52 and the sides creates limited rotation of the element in a clockwise direction. This action of the friction elements 52 relative to the friction element 36 cams the first mentioned friction elements against the sides 18 and 20 thus supplementing the applying force from the piston and levers. The friction elements 52 anchor through the balls 60 on the friction element 36 pivoting the latter clockwise about anchor 30, as viewed in Figure 1. It will be noted that this pivotal action of the element 36 moves the lining 64 of the shoe away from the cylindrical portion 16 of the drum. Hence for reverse braking only the disk elements are effective.

Although this invention has been described in connection with certain specific embodiments, the principles are susceptible of numerous other applications that will readily occur to persons skilled in the art.

I claim:

1. In a brake, a rotatable member having two substantially flat spaced apart surfaces and a cylindrical surface, a fixed member, a friction unit carried on said fixed member and including oppositely-acting first friction elements axially spreadable for engagement with said flat spaced-apart surfaces and an arcuate shoe element substantially radially movable for engagement with said cylindrical surface, a ball and ramp connection between at least one of said oppositely-facing elements and said arcuate shoe element, a fluid motor mounted on said fixed member with the axis of the motor parallel to the brake axis, and a lever connecting said motor to said oppositely-facing elements to impart axial motion thereto for establishing engagement with said spaced-apart surfaces to thereby cause said arcuate shoe element to move substantially radially.

2. In a brake assembly, a single rotatable member provided with three surfaces, one cylindrical and two oppositely facing plane surfaces, a friction unit comprising a first friction element pivotally carried for movement against said cylindrical surface, oppositely-facing parallel second friction elements floatably mounted on said first mentioned friction element, means for producing axial movement of said second friction elements for producing application thereof against said plane surfaces, said second friction elements being operatively connected to said first friction element for circumferential movement upon engagement between said second friction elements and said plane surfaces, and hydraulic means operatively connected to said friction unit.

3. In a brake, a rotatable member providing three braking surfaces, a fixed member, a first friction element pivotally carried on said fixed member for substantially radial movement into engagement with one of said braking surfaces, said friction element being constructed and arranged for self energization, oppositely-acting second friction elements arranged adjacent said other braking surfaces for opposite axial movement thereagainst, means operatively connecting said first friction element with said second friction elements, a fluid motor supported on said fixed member with the axis of the motor substantially parallel to the brake axis, said second friction elements being constructed and arranged for self energization, and a lever connecting said motor to said second friction elements.

4. In a brake, oppositely-facing substantially parallel disk friction elements, a shoe friction element, a fluid motor, lever means interconnecting said disk friction elements and said motor, and ball ramp connections between said disk friction elements and said shoe element.

5. In a brake, oppositely-facing substantially parallel disk friction elements, a shoe friction element, a fluid motor, lever means interconnecting said disk friction elements and said motor, and means interconnecting all said friction elements producing self energization of said disk friction elements and actuation of said shoe friction element.

6. In a brake, oppositely-acting disk friction elements, a shoe friction element, a fluid motor having a piston and a stationary member coaxially arranged thereof, a first lever connected to said piston, a second lever connected to said stationary member at a point along the axis of said fluid motor, a link operatively connecting the levers, and a ball ramp connection between said disk friction elements and said shoe friction element, said levers being interconnected with said disk friction elements to introduce spreading thereof and to cause actuation of said shoe friction element upon energization of said fluid motor.

7. In a brake, oppositely-facing parallel disk friction elements, a shoe friction element, a fluid motor provided with a movable member and a stationary member coaxial of said motor, a ball and ramp connection between each of said disk friction elements and said shoe friction element, and a pair of levers interconnecting said disk friction elements and said movable and stationary members, said levers being pivotally associated with said members and said disk friction elements.

8. In a brake, a rotatable member provided with three braking surfaces, a first friction element pivotally mounted for engagement with one of the braking surfaces, oppositely-facing parallel second friction elements positioned adjacent the other braking surfaces for engagement therewith, said second friction elements being mounted on said first friction element for axial and circumferential movement, cam means interposed between each of said second elements and said first element, adjusting mechanism connected to said first friction element, and actuating means operatively connected to said second friction elements.

9. In a brake, a rotatable member having parallel sides and a cylindrical portion joining the sides, a fixed member, shoe elements engageable with said cylindrical portion and pivotally carried on the fixed member, a pair of oppositely-acting disk elements for each shoe element engageable with the respective sides, a fluid motor for each shoe element and its associated disk elements, said fluid motor being supported by said fixed member, cam means connecting each shoe and its associated disk elements for operative relationship, a piston in the fluid motor, a first lever pivotally mounted on the piston and connecting it to one of said pair of disk elements, a stationary member, a second lever pivotally mounted on the stationary member and connecting it to the other of said pair of disk elements, a link interposed between said levers, and an adjusting mechanism for each shoe element.

10. In a brake assembly, a single rotor providing three friction element engaging surfaces, two of said surfaces being substantially flat, annular, laterally spaced apart surfaces and the third of said surfaces being cylindrical and joining said first two mentioned surfaces, and a brake unit engageable with each of the surfaces of said rotor and comprising a fixed carrier member, an arcuate shoe fulcrumed at one end thereof on said carrier member, and applying means for developing radial applying thrust on the other end of said shoe and including two oppositely-acting friction members which are spreadable into engagement with the substantially flat surfaces of said rotor, means for pivoting said oppositely-acting friction members independently of said arcuate friction member, said oppositely-acting friction members and said arcuate shoe being in circumferential sequence, and means operatively interconnecting both said friction members by which pivotal movement of said oppositely-acting friction members produces radial application of said arcuate shoe.

11. In a brake assembly according to claim 10, an actuator for said oppositely-acting friction members comprising a pair of articulated levers one lever being associated at the end thereof with each of said oppositely-acting friction members, means for securing the opposite end of one of said levers and applying means for exerting effort on the opposite end of the other of said levers.

12. In a brake assembly according to claim 11, a fluid motor transversely mounted to be parallel to the brake axis, and a fluid pressure responsive piston therein operatively combined with the actuable end of one of said articulated levers.

13. In a brake assembly according to claim 10, an automatic adjustor combined with said arcuate shoe and comprising means fixed to said carrier member, a second means fixed to said arcuate shoe and a one way clutch which permits relative movement of said two mentioned means in one direction only whereby the shoe is adjustably positioned relatively to the cylindrical surface of said rotor.

14. In a brake assembly according to claim 10, a resilient member combined with said arcuate shoe to exert retractile force thereon to hold said arcuate shoe in a normally released position.

15. The brake assembly of claim 10 in which the means operatively interconnecting said friction members and arcuate shoe comprises energizing means for spreading said oppositely-acting friction members.

16. In a brake, a rotatable member provided with three braking surfaces, a fixed member, an arcuate first friction element engageable with one of said braking surfaces, an anchor for said arcuate friction element located at one end of said element radially inwardly from said braking surfaces and providing a fulcrum for said arcuate friction element, oppositely-facing parallel second friction elements positioned for engagement with the other two braking surfaces, one of said elements being located on each side of and floatably carried by said arcuate friction element, means for fulcruming said second friction elements separately from said first friction element, and a fluid motor remotely located from said second friction elements and operatively connected thereto.

17. In a brake, a fixed member, a rotatable member provided with spaced-apart parallel sides joined by a cylindrical surface, an arcuate first friction element pivotally mounted at one of its ends on said fixed member for engagement with the cylindrical surface of said rotatable member, oppositely-facing parallel second friction elements positioned adjacent the spaced-apart sides of said rotatable member for engagement therewith, each of said second friction elements being supported at one end by said first friction element, an operative cam connection between said first friction element and each of said second friction elements, said first friction element having substantially radial movement and said second friction elements having both axial and circumferential movement, means for fulcruming said second friction elements separately from said first friction element, and actuating means for said second friction elements.

References Cited in the file of this patent

UNITED STATES PATENTS

| Number | Name | Date |
|---|---|---|
| 443,665 | Bird | Dec. 30, 1890 |
| 799,691 | Sturtevant | Sept. 19, 1905 |
| 1,505,216 | Myrick | Aug. 19, 1924 |
| 1,603,963 | Liebowitz | Oct. 19, 1926 |
| 1,858,973 | Steele | May 17, 1932 |
| 1,928,630 | Penrose | Oct. 3, 1933 |
| 1,956,315 | Collins | Apr. 24, 1934 |
| 2,050,902 | Tatter | Aug. 11, 1936 |
| 2,057,422 | Dickson | Oct. 13, 1936 |
| 2,060,908 | Starr | Nov. 17, 1936 |
| 2,065,382 | Levy | Dec. 22, 1936 |
| 2,115,083 | Pierce | Apr. 26, 1938 |
| 2,120,917 | Hause | June 14, 1938 |
| 2,174,398 | Farmer | Sept. 26, 1939 |
| 2,304,368 | Milan | Dec. 8, 1942 |
| 2,359,788 | Pierce | Oct. 10, 1944 |
| 2,372,319 | Francois | Mar. 27, 1945 |
| 2,518,411 | Wilson | Aug. 8, 1950 |
| 2,538,232 | Bowe | Jan. 16, 1951 |
| 2,569,012 | Lauer | Sept. 25, 1951 |
| 2,602,525 | Jurgens | July 8, 1952 |
| 2,629,473 | Vincent | Feb. 24, 1953 |
| 2,751,046 | Tack | June 19, 1956 |

FOREIGN PATENTS

| Number | Country | Date |
|---|---|---|
| 707,074 | Germany | June 12, 1941 |